(12) United States Patent
Kanehisa et al.

(10) Patent No.: US 6,401,899 B1
(45) Date of Patent: Jun. 11, 2002

(54) PARKING LOCK DEVICE AND METHOD FOR AUTOMATIC TRANSMISSION

(75) Inventors: Takanori Kanehisa, Hachiouji; Yasuhiro Yamauchi, Zama; Takao Koyama, Atsugi, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/717,235

(22) Filed: Nov. 22, 2000

(30) Foreign Application Priority Data

Nov. 25, 1999 (JP) .......................................... 11-333915

(51) Int. Cl.[7] .............................................. B60K 41/26
(52) U.S. Cl. ....................... 192/219.5; 192/219; 701/70
(58) Field of Search ............................. 192/219, 219.4, 192/219.5, 221; 74/411.5; 188/31, 69, 68; 701/70, 79

(56) References Cited

U.S. PATENT DOCUMENTS 5,206,808 A    4/1993  Inoue et al.
5,993,351 A   11/1999  Deguchi et al.

FOREIGN PATENT DOCUMENTS

JP    5-39847 A    2/1993
JP    5-280637 A   10/1993

*Primary Examiner*—Richard M. Lorence
(74) *Attorney, Agent, or Firm*—Foley & Lardner

(57) ABSTRACT

A parking lock device comprises a parking lock mechanism (12) which locks an output shaft (1A) of a vehicle automatic transmission (1) when a shift lever (18) is changed over to a parking range, and an automatic brake device (14) which brakes the vehicle. When the shift lever (18) is changed over to the parking range at a vehicle speed is not less than a predetermined vehicle speed VSP1, a control unit (15) first operates the automatic brake device (14) to decelerate the vehicle and then operates the parking lock mechanism (12) after the vehicle speed has dropped to less than the predetermined vehicle speed VSP1. By this deceleration, the shock given to the vehicle by locking the output shaft (1A) while the vehicle is running is suppressed. The load of the parking lock mechanism due to the locking of the output shaft (1A) is also alleviated.

9 Claims, 7 Drawing Sheets

2: CONTROL MODULE
4: RANGE SELECTION ACTUATOR
5, 6: SHIFT SOLENOID VALVE
11: PARKING LOCK ACTUATOR

PARKING LOCK DEVICE AND METHOD FOR AUTOMATIC TRANSMISSION

FIELD OF THE INVENTION

This invention relates to a parking lock mechanism which locks an output shaft of an automatic transmission of a vehicle when a parking range is selected by a driver.

BACKGROUND OF THE INVENTION

In a vehicle provided with an automatic transmission, a so-called shift by wire parking lock mechanism is known which locks the output shaft of the automatic transmission by the action of an actuator such as a motor according to the movement of a shift lever to a parking range. If the driver unexpectedly moves the shift lever to the parking range while the vehicle is running, however, a shock occurs due to sudden locking of the output shaft of the transmission which may give a discomfort to driver or passenger of the vehicle. Further, sudden locking of the output shaft may give damage to the parking lock mechanism.

In this connection, Tokkai Hei 5-280637 published by the Japanese Patent Office in 1993 discloses a parking lock mechanism wherein, when a certain predetermined vehicle speed condition is satisfied while the vehicle is running, operation of the parking lock mechanism is permitted after emitting an alarm sound, and when the vehicle speed condition is not satisfied, the operation of the parking lock mechanism is ineffectual.

SUMMARY OF THE INVENTION

In this parking lock mechanism, as the transition to the parking lock state is notified in advance to the driver, the driver is not startled by an unintended shock, but there is no difference from the state where there is a transition to the parking lock state when the vehicle is running.

In other words, all the kinetic energy of the vehicle is stopped by the parking lock mechanism alone, so a large shock nevertheless occurs, and the parking lock mechanism must also be strong enough to stop the kinetic energy of the vehicle.

The output shaft is restricted by the engaging of a locking pawl with a parking gear which rotates together with the output shaft of the automatic transmission. When the vehicle speed exceeds a predetermined value, the locking pawl does not enter the teeth of the locking gear as the teeth of the rotating parking gear push aside the locking pawl. However, the driver or passengers hear an unpleasant noise when the parking gear pushes aside the locking pawl.

Further, when the shift lever is moved to the parking range before the driver stops the vehicle, the parking mechanism does not operate if the vehicle speed condition is not satisfied. If the intended parking lock operation is not performed, it may even occur that the driver mistakenly considers the vehicle has a fault, and hastily operates the shift lever repeatedly.

It is therefore an object of this invention to mitigate the shock due to the operation of a parking lock mechanism on a vehicle when the vehicle is running.

It is another object of this invention to mitigate the load on the parking lock mechanism due to the operation of the parking lock mechanism when the vehicle is running.

It is yet another object of this invention to prevent an unpleasant noise due to the operation of the parking lock mechanism when the vehicle is running.

It is yet another object of this invention to perform a parking lock operation intended by the driver while still achieving the above objects.

In order to achieve the above objects, this invention provides a parking lock device which locks an output shaft of an automatic transmission of a vehicle according to a change-over of a shift lever to a parking range. The parking lock device comprises a parking lock mechanism which locks a rotational movement of the output shaft, a sensor which detects a vehicle speed, a sensor which detects the change-over of the shift lever to the parking range, a braking device which brakes the vehicle, and a microprocessor. The microprocessor is programmed to determine whether or not the vehicle speed is less than a first predetermined vehicle speed, activate the braking device to decelerate the vehicle when the shift lever has changed over to the parking range at a vehicle speed not less than the first predetermined vehicle speed, and prevent the parking lock mechanism from locking the rotation of the output shaft until the vehicle speed becomes less than the first predetermined speed.

The details as well as other features and advantages of this invention are set forth in the remainder of the specification and are shown in the accompanying drawings.

DESCRIPTION OF THE PREFERRED EMBODIMENTS

Figure 1:
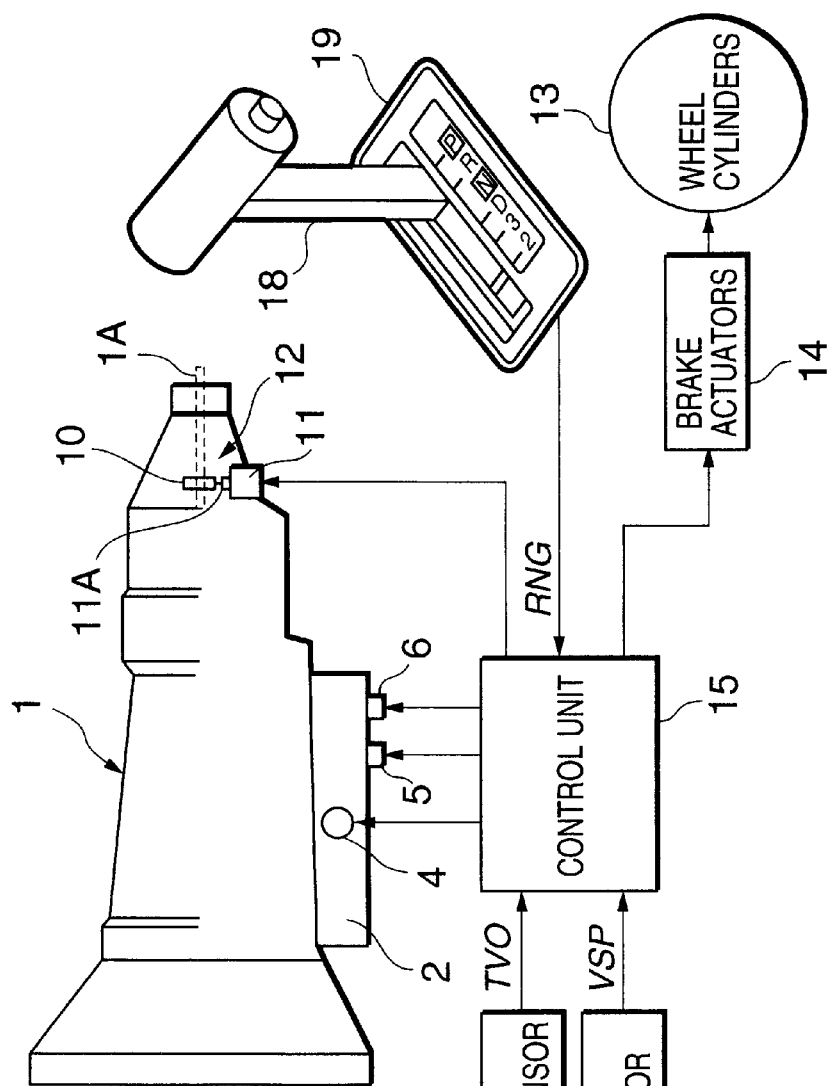
FIG. 1 is a schematic diagram of a controller of an automatic transmission for a vehicle provided with a parking lock mechanism according to this invention.

Referring to FIG. 1 of the drawings, an automatic transmission 1 comprises a control module 2 containing an oil pressure circuit for speed ratio control.

The transmission 1 is connected to an engine of a vehicle, not shown. The control module 2 comprises a range selection actuator 4 such as a motor which strokes a manual valve 3 shown in FIG. 2 according to a selection range of a shift lever 18 and shift solenoid valves 5, 6 which change a power transmission path inside the automatic transmission 1. The shift solenoid valves 5, 6 operate according to input signals, and vary a speed ratio by operating a clutch or brake of a planetary gear mechanism of the automatic transmission 1 using the oil pressure supplied from the manual valve 3.

Figure 2:
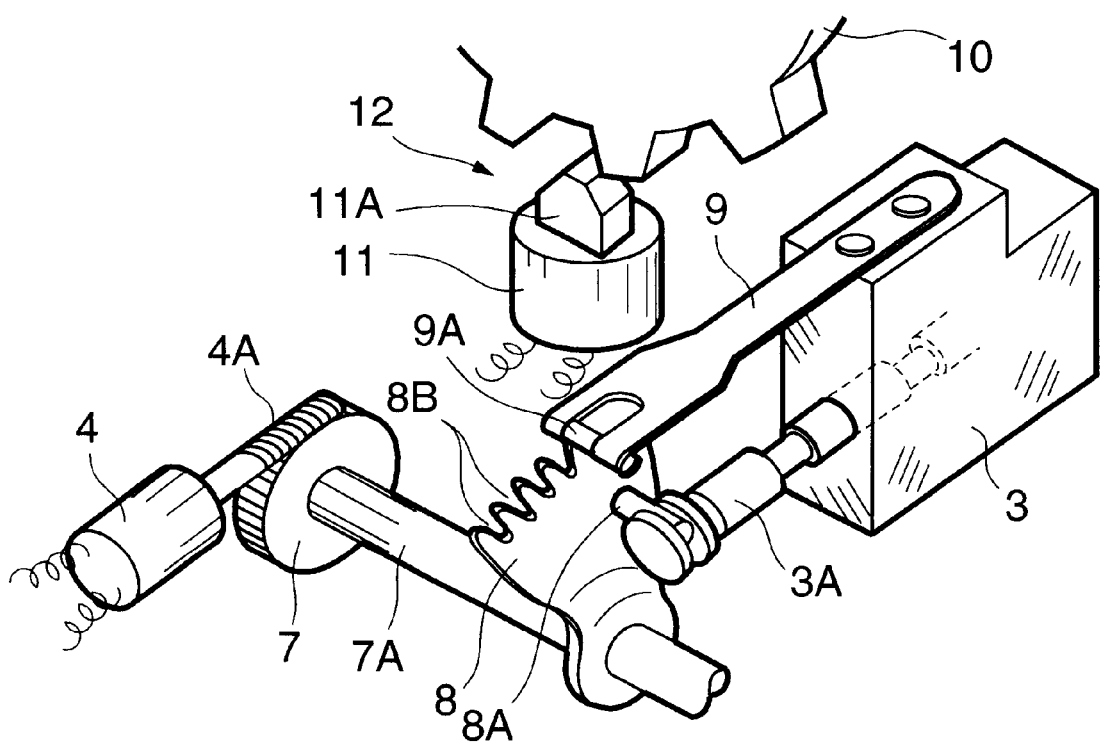
FIG. 2 is a perspective view of a range change-over mechanism and the parking lock mechanism according to this invention.

Referring to FIG. 2, the manual valve 3 and range selection actuator 4 are joined via a worm 4A formed on the output shaft of the range selection actuator 4, a gear 7 which engages with the worm A, a sector piece 8 engaged with a shaft 7A of the gear 7, a pin 8A fixed to the sector piece 8, and a rod 3A engaging with the pin 8A. The manual valve 3 comprises a spool that works as a valve body, and the rod 3A is joined to the spool.

When the range selection actuator 4 rotates the worm 4A, the pin 8A displaces the spool in the axial direction via the rod 3A. The manual valve 3 supplies the oil pressure of an oil pressure source to the shift solenoid valves 5, 6 according to the displacement position of the spool.

The displacement position of the rod 3A is defined by a detent mechanism comprising plural notches 8B formed in the sector material 8, and a roller 9A engaging with the notches 8B. The notches 8B are formed for each selection range. The roller 9A is supported on a case of the manual valve 3 via a plate spring 9.

The automatic transmission 1 has an output shaft 1A to drive the drive wheels and a parking lock mechanism 12 to lock the rotation of the output shaft 1A. The parking lock mechanism 12 comprises a parking gear 10 rotating with the output shaft 1A, a locking pawl 11A that can engage with the parking gear 10, and a parking lock actuator 11. The parking lock actuator 11 is an actuator that moves the locking pawl 11A towards and away from the parking gear 10 so as to cause the locking pawl 11A to engage with and disengage from the parking gear 10. In the state where the locking pawl 11A is engaged with the parking gear 10, the rotation of the output shaft 1A is locked. In the state where the locking pawl 11A is disengaged from the parking gear 10, the rotation of the output shaft 1A is not locked.

The speed ratio of the transmission is determined by combinations of ON and OFF of the input signal to the shift solenoid valve 5 and ON and OFF of the input signal to the shift solenoid valve 6. These signals are controlled by a control unit 15.

The control unit 15 controls the parking lock mechanism 12 by a signal output to the parking lock actuator 11, and performs brake control together with the operation of the parking lock of the parking lock mechanism 12 by supplying a braking pressure from brake actuators 14 to wheel cylinders 13 which apply a braking force on the wheels of the vehicle.

Here, the brake actuator 14 is an actuator which can supply a brake pressure to the wheel cylinder 13 according to a signal from the control unit 15 without depending on the operation of a brake pedal of the vehicle.

An automatic brake mechanism of this type is known from U.S. Pat. No. 5,206,808.

Specifically, pilot cylinders 9F, 9R, pump 15, reservoir 17, solenoid change-over valve 18 and pressure control valves 13R, 13L, 14R, 14L in U.S. Pat. No. 5,206,808 correspond to the brake actuator 14 of this embodiment. Further, the oil cylinders 5R, 5L, 6R, 6L disclosed in U.S. Pat. No. 5,206,808 correspond to the wheel cylinder 13 of this embodiment.

In order to control the parking lock mechanism 12 and the brake actuators 14, signals are respectively input to the control unit 15 from a throttle opening sensor 16 which detects a throttle opening TVO of the engine, a vehicle speed sensor 17 which detects a vehicle speed VSP, and a shift lever switch 19 which detects a selection range RNG of the shift lever 18.

The control unit 15 comprises a microprocessor having a central processing unit (CPU), a read-only memory (ROM), a random access memory (RAM) and an input/output interface (I/O interface).

Figure 3:
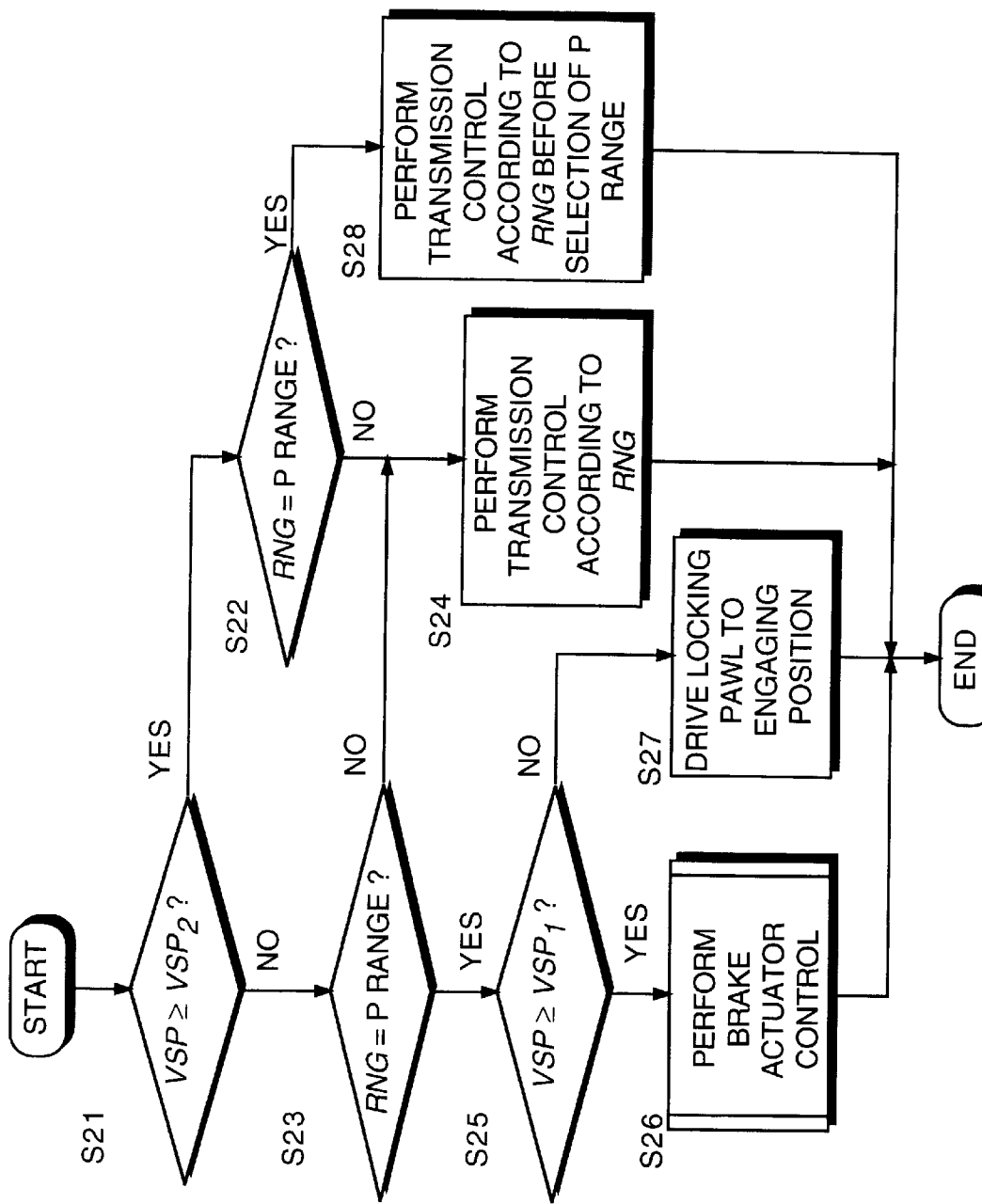
FIG. 3 is a flowchart describing a main routine for parking lock control and speed change control performed by a control unit according to this invention.
Figure 4:
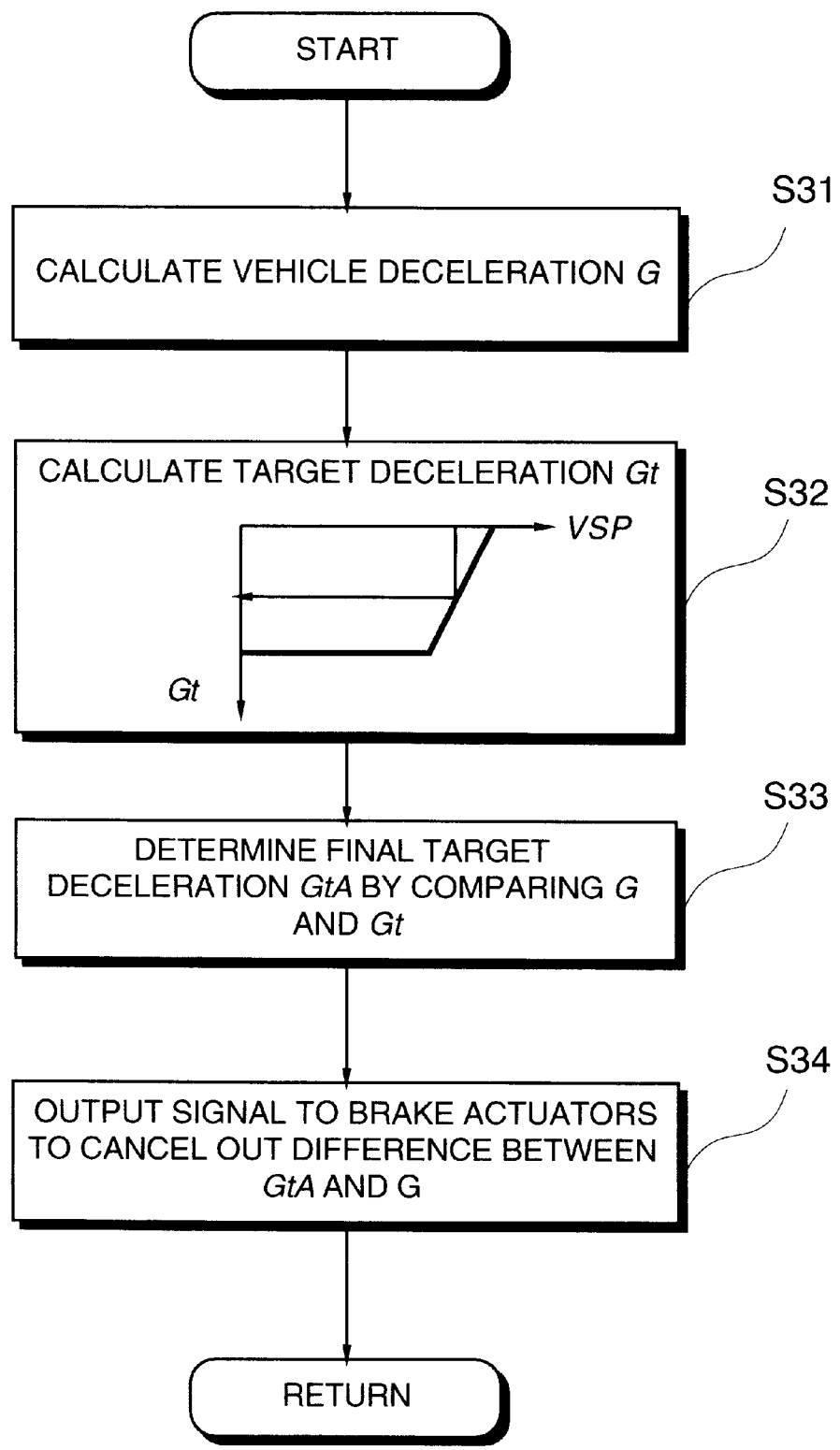
FIG. 4 is a flowchart describing an automatic brake force computing routine performed by the control unit.

The control unit 15 performs parking lock control and transmission control by performing a routine shown in FIG. 3 and a related subroutine shown in FIG. 4 based on these input signals.

The routine and the subroutine are performed at an interval of ten milliseconds while the vehicle is running.

In a step S21, the vehicle speed VSP is compared with a predetermined vehicle speed VSP2 for determining a stationary state. A new vehicle speed VSP is detected each time the routine is performed. The predetermined vehicle speed VSP2 is for distinguishing vehicle speeds which are unsuitable for parking lock operation by any means, and vehicle speeds at which parking lock operation is possible if it is combined with a deceleration operation of the vehicle. The predetermined vehicle speed VSP2 is set to, for example, 20 km/hr.

When the vehicle speed VSP is less than the predetermined vehicle speed VSP2, it may be considered that the vehicle is in a range wherein a parking lock operation is possible. In this case, the routine proceeds to a step S23.

In the step S23, it is determined whether or not the selection range RNG is a parking range (P). When the selection range RNG is the parking range (P), the routine proceeds to a step S25.

In the step 825, the vehicle speed VSP is compared with another predetermined vehicle speed VSP1. The predetermined vehicle speed VSP1 is set in order to determine whether or not the vehicle deceleration is necessary when the parking lock operation is performed. Therefore, the predetermined speed VSP1 is set smaller than the predetermined speed VSP2, for example to 8 km/hr.

When the vehicle speed VSP is equal to or greater than the predetermined vehicle speed VSP1, the routine proceeds to a step 326. When the vehicle speed VSP is less than the predetermined vehicle speed VSP1, the routine proceeds to a step S27.

The routine proceeds to the step S27 when the vehicle is hardly moving. In this case, the parking lock operation is performed. Specifically, the parking lock actuator 11 is driven so that the locking pawl 11A is engaged with the parking gear 10, and the rotation of the output shaft 1A of the automatic transmission 1 is locked. After the processing of the step 827, the routine is terminated.

On the other hand, when the vehicle speed VSP is equal to or greater than the predetermined vehicle speed VSP1, an automatic braking operation is first performed in the step S26 to decrease the vehicle speed VSP. The automatic brake operation is an operation where the required braking pressure is supplied to the wheel cylinders 13 by the braking actuators 14 without depending on the depression of the brake pedal by the driver. In the following description, for the purpose of showing a difference, depression of the brake pedal by the driver will be referred to as intentional braking.

The processing of the step S26 is performed using the routine shown in FIG. 4.

Describing this subroutine, first in a step S31, a real vehicle deceleration G is computed based on the variation of the vehicle speed VSP. Herein, deceleration is computed as a negative acceleration.

In a following step S32, by looking up a prestored map, a target deceleration Gt is calculated from the vehicle speed VSP.

In a following step S33, the real vehicle deceleration G and a target deceleration at are compared, and the larger of their absolute values is selected as a final target deceleration GtA.

In a next step S34, a difference between the final target deceleration GtA and the real vehicle deceleration G is computed, and the required pressure of the wheel cylinders 13 is calculated so that this difference Is zero. A signal corresponding to this required pressure is then output to the brake actuators 14, and the subroutine is terminated.

Figure 5A:
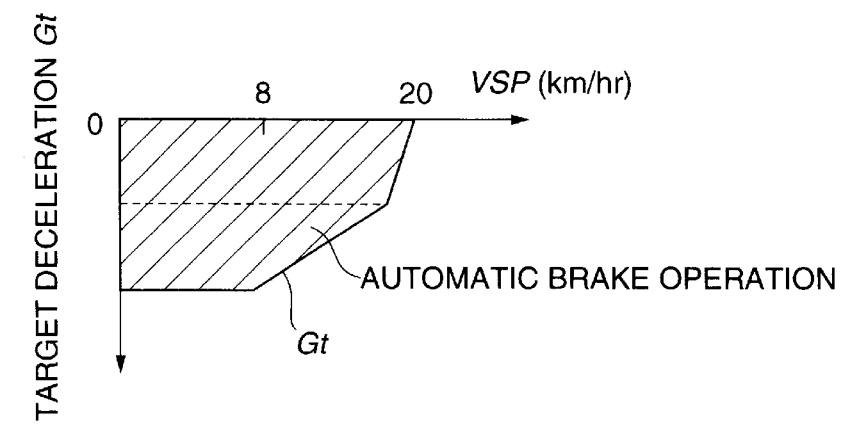
FIGS. 5A–5C are diagrams describing a relation between a vehicle speed and a vehicle deceleration according to this invention.
Figure 5B:
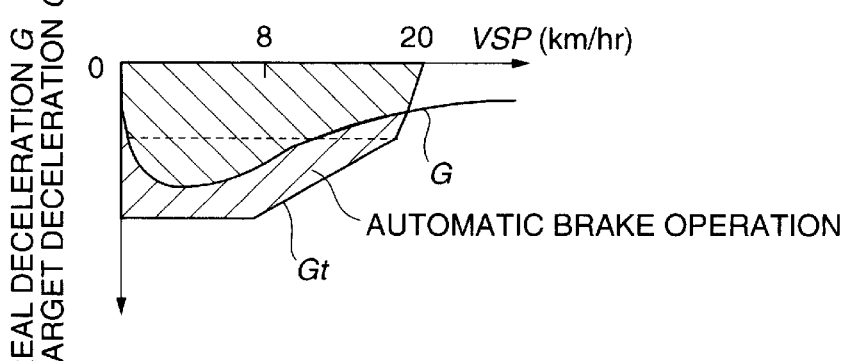
Figure 5C:
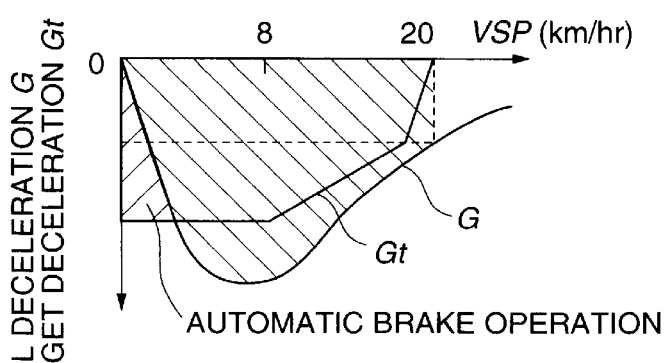

Here, referring to FIGS. 5A–5C, when an intentional brake operation is not performed, the target deceleration at is achieved purely by an automatic brake operation.

On the other hand, when the brake pedal is largely depressed by an intentional brake operation, there is no need to operate the automatic brake unless tile vehicle speed VSP is in a very low speed range, as shown in FIG. 5C.

When an intentional, moderate degree of braking is performed, the deceleration G due to the intentional brake operation does not reach the target deceleration, so the difference between the target deceleration GtA and the deceleration G due to an intentional brake operation is compensated by an automatic brake operation.

Now, in the step S26, the control unit 15 terminates the routine after an automatic brake operation is performed using the subroutine of FIG. 4. Even on the next and subsequent occasions when the routine is performed, provided that the vehicle speed VSP is not less than the predetermined vehicle speed VSP1, the automatic brake operation is again performed in the step S26.

On the other hand, when the selection range RNG shows a range other than the parking range (P) in the step S23, the parking lock operation is unnecessary. In this case, in a step S24, the routine is terminated after performing ordinary control of the automatic transmission 1 based on the selected range RNG. The ranges other than the parking range (P) comprise a drive range (D), low speed ranges such as first gear (1), second gear (2) and third gear (3), a reverse range (R) and a neutral range (N).

Ordinary control of the automatic transmission 1 means that neither parking lock nor braking is performed, and that only operation of the shift solenoid valves 5, 6 is performed.

In the step S21, when the vehicle speed VSP is equal to or greater than the predetermined vehicle speed VSP2, it means that the vehicle is running at a speed which is unsuitable for parking lock operation.

In this case, in a step S22, the routine determines whether or not the selection range RNG shows the parking range (P), as in the step S23.

When the selection range RNG shows a range other than the parking range (P), the routine performs ordinary control of the automatic transmission 1 based on the selection range RIG in the step S24, as in the case where an identical determining result is obtained in the step S23, and the routine is terminated.

On the other hand, when tile selection range RNG shows the parking range (P) in the step S22, the routine proceeds to a step S28.

Here, control of the automatic transmission 1 is performed based on the selection range RNG prior to selecting the parking range (P), and the routine is terminated. Specifically, if the drive range (D) is selected prior to selecting the parking range (P), speed ratio control in the drive range (D) is performed, and if the reverse range (R) is selected prior to selecting the parking range (P). speed ratio control in the reverse range (R) is performed.

In other words, even if the parking range (P) is selected, parking lock operation and drive of the brake actuators 14 based on the parking range (P) are not performed, and control of the automatic transmission 1 prior to the selection of the parking range (P) is performed instead.

After performing the step S28, the routine is terminated.

Due to the execution of the routine, when the vehicle speed VSP is equal to or greater than VSP2, the operation is ignored even if the shift lever 18 is moved to the parking range (P), and control of the automatic transmission 1 is performed based on the range RNG before the changeover to the parking range (P).

Under the condition that the vehicle speed VSP is less than VSP2 and equal to or greater than VSPS, when the shift lever 18 is operated to the parking range (P), automatic braking is first performed until the vehicle speed VSP becomes equal to VSP1, then a parking lock operation is performed.

When the vehicle speed VSP is less than VSP1, and the shift lever 18 is moved to the parking range, a parking lock operation Is immediately performed. In this region, even if a parking lock operation is performed wherein the locking pawl 11A is engaged with the parking gear 10, an unpleasant shock or noise is not produced, and the force exerted by the locking pawl 11A on the parking gear 10 can be suppressed low.

By setting a deceleration range between the vehicle speeds VSP2 and VSP1, performing a parking lock operation in a relatively high speed range is made possible.

At the same time, by performing an automatic brake operation prior to locking up the parking gear 10, the load on the parking lock members such as the locking pawl 11A and parking gear 10 when the parking lock operation is performed can be suppressed to the same level as the parking lock operation performed below the vehicle speed VSP1. Further, a parking lock operation is not performed until deceleration to the vehicle speed VSP1, so an unpleasant noise due to the lipping off of the locking pawl 11A from the teeth of the parking gear 10 is not produced.

If the vehicle speed VSP is less than VSP2, a parking lock operation will definitely be performed due to the movement of the shift lever 18 to the Parking range (P) even if the vehicle is not in the stationary state. Hence, there is no reason for the driver to repeatedly operate the shift lever 18 due to misunderstanding that the vehicle has a fault.

According to tins embodiment, an automatic brake comprising the brake actuators 14 and the wheel cylinders 13 was used, but another brake may be used instead.

U.S. Pat. No. 5,993,351 discloses a hybrid vehicle wherein an engine is combined with an electric motor, and regenerative braking that has a similar effect to engine braking is performed by making the motor generate electricity using the rotation energy of the drive wheels.

When this invention is applied to such a hybrid vehicle, the automatic brake operation of the step S26 may be performed by using the regenerative braking mechanism comprising the motor 4, inverter and battery 14 of U.S. Pat. No. 5,993,351.

Figure 6:
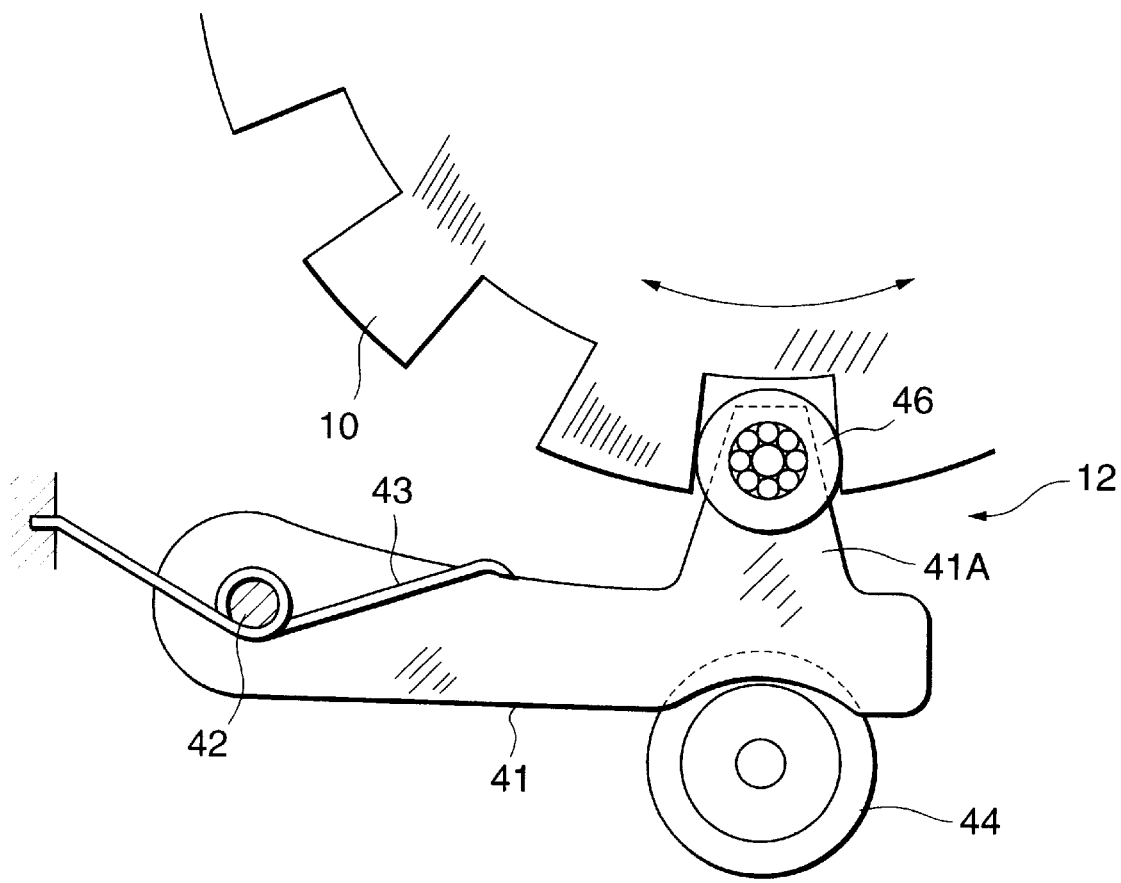
FIG. 6 is an enlarged lateral view of a parking lock mechanism according to a second embodiment of this invention.
Figure 7:
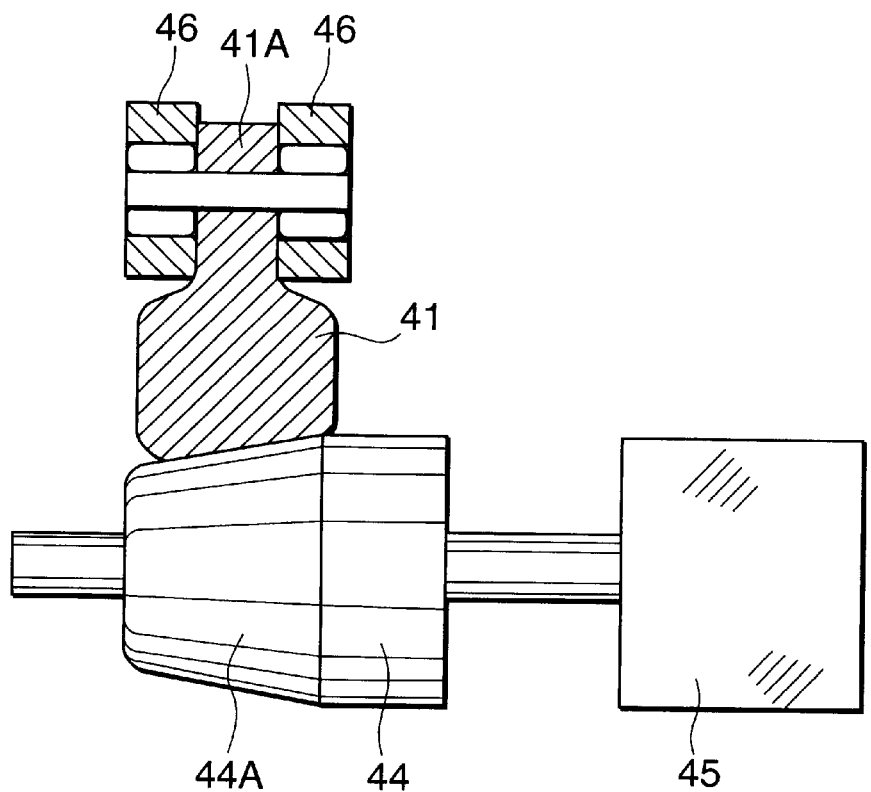
FIG. 7 is an enlarged transverse view of a cam of the parking lock mechanism according to the second embodiment of this invention.

Referring to FIGS. 6 and 7, a second embodiment of this invention relating to the parking lock mechanism 12 will now be described.

According to this embodiment, instead of the locking pawl 11A and parking lock actuator 11 of the first embodiment, the parking lock mechanism 12 comprises a locking pawl 41A, lever 41, conical cam 44 and parking lock actuator 45.

Referring to FIG. 6, the locking pawl 41A is formed at one end of the lever 41. A lever 41 is supported free to rotate on the case of the manual valve 3 via a pin 42, and is pushed in a direction tending to separate it from the parking gear 10 by a return spring 43. A pair of rollers 46 that can engage with the teeth of the parking gear 10 are attached at one end of the locking pawl 41A. The lower end of the lever 41 comes in contact with the conical cam 44.

Referring to FIG. 7, the conical cam 44 has a conical surface which comes in contact with the lever 41.

The conical cam 44 is attached to a tip of the parking lock actuator 45 and as the parking lock actuator 45 elongates, the lever 41 is pushed up against the return spring 43 by the conical surface of the conical cam 44, and the roller 46 is engaged with the teeth of the parking gear 10. For this purpose, the contact surface of the lever 41 with the conical cam 44 is formed in a concave shape which fits the cam surface of the conical cam 44.

In this way, by attaching the roller 46 to the locking pawl 41A, engaging with and disengaging from the teeth of the parking gear 10 is rendered smooth by the rolling action of the roller 46, and the drive force of the parking lock actuator 45 can be made small. According to research performed by the inventors, it is desirable to set the pressure angle of the teeth of the parking gear 10 to $0°±5°$.

Figure 8:
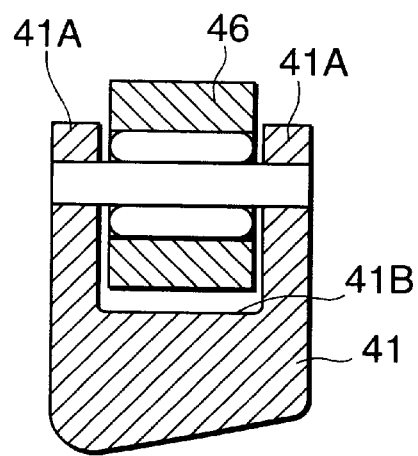
FIG. 8 is an enlarged transverse view of a locking pawl of the parking lock mechanism according to a third embodiment of this invention.

Referring to FIG. 8, a third embodiment of this invention relating to the locking pawl 11A will now be described.

According to this embodiment, instead of providing the pair of rollers 46 on either side of the locking pawl 11A as in the second embodiment, a U-shaped groove 41B is formed at the tip of the locking pawl 41A, and a single roller 46 is housed In this groove 41B. In this case also, as in the second embodiment, engaging and disengaging of the locking pawl 41A with the teeth of the parking gear 10 is rendered smooth by the roller 46.

The contents of Tokugan Hei 11-333915, with a filing date of Nov. 25, 1999 in Japan, U.S. Pat. No. 5,206,808 and U.S. Pat. No. 5,993,351 are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A parking lock device which locks an output shaft of an automatic transmission of a vehicle according to a change-over of a shift lever to a parking range, comprising:
   a parking lock mechanism which locks a rotational movement of the output shaft;
   a sensor which detects a vehicle speed;
   a sensor which detects the change-over of the shift lever to the parking range;
   a braking device which brakes the vehicle; and
   a microprocessor programmed to:
      determine whether or not the vehicle speed is less than a first predetermined vehicle speed;
      activate the braking device to decelerate the vehicle when the shift lever has changed over to the parking range at a vehicle speed not less than the first predetermined vehicle speed; and
      prevent the parking lock mechanism from locking the rotation of the output shaft until the vehicle speed becomes less than the first predetermined speed.

2. The parking lock device as defined in claim 1, wherein the microprocessor is further programmed to calculate a real vehicle deceleration based on the vehicle speed and calculate a target vehicle deceleration based on the vehicle speed, and control a braking force of the braking device to cancel out the difference between the target vehicle deceleration and the real vehicle deceleration.

3. The parking lock device as defined in claim 1, wherein the microprocessor is further programmed to prevent the braking device and the parking lock mechanism from operating when the shift lever has changed over to the parking range at a vehicle speed not less than a second predetermined vehicle speed that is set to be larger than the first predetermined vehicle speed.

4. The parking lock device as defined in claim 1, wherein the vehicle comprises a wheel cylinder which brakes a vehicle wheel according to an input pressure, the braking device comprises a brake actuator which supplies pressure to the wheel cylinder according to a signal, and the microprocessor is further programmed to activate the braking device by outputting the signal to the brake actuator.

5. The parking lock device as defined in claim 1, wherein the braking device comprises a regenerative braking mechanism which exerts a braking force on the vehicle due to generation of power from a rotation energy of a vehicle wheel in contact with the ground surface.

6. The parking lock device as defined in claim 1, wherein the parking lock mechanism comprises a parking gear fixed to the output shaft, a locking pawl which can engage with the parking gear, and a parking lock actuator which drives the locking pawl to an engaging position with the parking gear.

7. The parking lock device as defined in claim 6, wherein the parking gear has teeth and the locking pawl comprises a roller which fits between the teeth of the parking gear.

8. A parking lock device which locks an output shaft of an automatic transmission of a vehicle according to a change-over of a shift lever to a parking range, comprising:
   means for locking a rotational movement of the output shaft;
   means for detecting a vehicle speed;
   means for detecting the change-over of the shift lever to the parking range;
   means for braking the vehicle;
   means for determining whether or not the vehicle speed is less than a first predetermined vehicle speed;
   means for activating the braking means to decelerate the vehicle when the shift lever has changed over to the parking range at a vehicle speed not less than the first predetermined vehicle speed; and
   means for preventing the locking means from locking the rotation of the output shaft until the vehicle speed becomes less than the first predetermined speed.

9. A method for locking an output shaft of an automatic transmission of a vehicle by applying a parking lock mechanism and a braking device according to a change-over of a shift lever to a parking range, comprising:
   detecting a vehicle speed;
   detecting the change-over of the shift lever to the parking range;
   determining whether or not the vehicle speed is less than a first predetermined vehicle speed;
   activating the braking device to decelerate the vehicle when the shift lever has changed over to the parking range at a vehicle speed not less than the first predetermined vehicle speed; and
   preventing the parking lock mechanism from locking the rotation of the output shaft until the vehicle speed becomes less than the first predetermined speed.

* * * * *